United States Patent
Wang et al.

(10) Patent No.: US 7,430,497 B2
(45) Date of Patent: Sep. 30, 2008

(54) STATISTICAL MODEL FOR GLOBAL LOCALIZATION

(75) Inventors: Jian Wang, Beijing (CN); Zheng Chen, Beijing (CN); Xiaoxu Ma, Beijing (CN); Yingnong Dang, Beijing (CN); Liyong Chen, Beijing (CN); Jiang Wu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 627 days.

(21) Appl. No.: 10/284,421

(22) Filed: Oct. 31, 2002

(65) Prior Publication Data
US 2004/0085302 A1  May 6, 2004

(51) Int. Cl.
*G06F 17/00* (2006.01)
(52) U.S. Cl. .................. 703/2; 382/173; 382/177; 382/179; 382/187; 382/188; 382/189; 382/314; 382/316
(58) Field of Classification Search ............. 709/223; 382/181, 253, 284, 232, 173, 312–314, 177, 382/179, 187–189, 316; 703/2
See application file for complete search history.

(56) References Cited

U.S. PATENT DOCUMENTS

| | | | |
|---|---|---|---|
| 4,742,558 A * | 5/1988 | Ishibashi et al. ............. 382/240 |
| 4,745,269 A | 5/1988 | Van Gils et al. |
| 4,764,885 A * | 8/1988 | Greanias et al. ............. 345/179 |
| 5,051,736 A * | 9/1991 | Bennett et al. ............... 345/180 |
| 5,073,966 A | 12/1991 | Sato |
| 5,247,137 A | 9/1993 | Epperson |
| 5,288,986 A | 2/1994 | Pine et al. |
| 5,294,792 A * | 3/1994 | Lewis et al. ................. 250/221 |
| 5,365,598 A * | 11/1994 | Sklarew ....................... 382/189 |
| 5,442,147 A | 8/1995 | Burns et al. |
| 5,448,372 A | 9/1995 | Axman et al. |
| 5,487,117 A * | 1/1996 | Burges et al. ................ 382/173 |
| 5,587,558 A | 12/1996 | Matsushima |
| 5,612,524 A | 3/1997 | Saint'Anselmo et al. |
| 5,644,652 A * | 7/1997 | Bellegarda et al. .......... 382/186 |
| 5,652,412 A * | 7/1997 | Lazzouni et al. .......... 178/18.01 |
| 5,661,506 A * | 8/1997 | Lazzouni et al. ............. 345/179 |
| 5,686,718 A | 11/1997 | Iawi et al. |

(Continued)

FOREIGN PATENT DOCUMENTS

CN  1352778  6/2002

(Continued)

OTHER PUBLICATIONS

Raymond Lau, Adaptive Statistical Language Modelling, May 1994, Submitted to the Department of electrical Engineering and Computer Science in Partial Fulfillment of the Requirements for the Degree of Master of Science at the MIT.*

(Continued)

*Primary Examiner*—Kamini Shah
*Assistant Examiner*—Kibrom K Gebresilassie
(74) *Attorney, Agent, or Firm*—Lee & Hayes, PLLC

(57) ABSTRACT

A system and process for determining the location of a captured image from a larger image is described. Using a list of determined locations, the system is able to determine the best or most likely path of a pen tip.

19 Claims, 9 Drawing Sheets

U.S. PATENT DOCUMENTS

| | | | | |
|---|---|---|---|---|
| 5,726,435 | A * | 3/1998 | Hara et al. | 235/494 |
| 5,817,992 | A * | 10/1998 | D'Antonio | 181/295 |
| 5,822,465 | A * | 10/1998 | Normile et al. | 382/253 |
| 5,825,015 | A | 10/1998 | Chan et al. | |
| 5,852,434 | A * | 12/1998 | Sekendur | 345/179 |
| 5,855,483 | A | 1/1999 | Collins et al. | |
| 5,898,166 | A | 4/1999 | Fukuda et al. | |
| 5,902,968 | A * | 5/1999 | Sato et al. | 178/19.01 |
| 5,937,110 | A | 8/1999 | Petrie et al. | |
| 5,960,124 | A * | 9/1999 | Taguchi et al. | 382/284 |
| 6,005,973 | A | 12/1999 | Seybold et al. | |
| 6,044,165 | A * | 3/2000 | Perona et al. | 382/103 |
| 6,052,481 | A * | 4/2000 | Grajski et al. | 382/187 |
| 6,076,734 | A * | 6/2000 | Dougherty et al. | 235/462.01 |
| 6,081,261 | A * | 6/2000 | Wolff et al. | 345/179 |
| 6,118,437 | A * | 9/2000 | Fleck et al. | 345/179 |
| 6,141,014 | A | 10/2000 | Endo et al. | |
| 6,226,636 | B1 | 5/2001 | Abdel-Mottaleb et al. | |
| 6,243,071 | B1 | 6/2001 | Shwarts et al. | |
| 6,249,614 | B1 | 6/2001 | Kolesnik et al. | |
| 6,278,968 | B1 | 8/2001 | Franz et al. | |
| 6,330,976 | B1 | 12/2001 | Dymetman et al. | |
| 6,479,768 | B1 | 11/2002 | How | |
| 6,542,635 | B1 * | 4/2003 | Hu et al. | 382/173 |
| 6,546,136 | B1 | 4/2003 | Hull | |
| 6,577,299 | B1 | 6/2003 | Schiller et al. | |
| 6,585,154 | B1 | 7/2003 | Ostrover et al. | |
| 6,633,671 | B2 * | 10/2003 | Munich et al. | 382/187 |
| 6,744,967 | B2 | 6/2004 | Kaminski et al. | |
| 6,752,317 | B2 * | 6/2004 | Dymetman et al. | 235/462.45 |
| 6,870,966 | B1 * | 3/2005 | Silverbrook et al. | 382/313 |
| 6,931,153 | B2 * | 8/2005 | Nakao et al. | 382/188 |
| 7,006,134 | B1 * | 2/2006 | Arai et al. | 348/222.1 |
| 7,043,096 | B2 * | 5/2006 | Silverbrook et al. | 382/313 |
| 7,068,821 | B2 * | 6/2006 | Matsutani | 382/119 |
| 7,095,909 | B1 * | 8/2006 | Beasley | 382/314 |
| 7,116,844 | B2 * | 10/2006 | Kawakami et al. | 382/314 |
| 7,128,270 | B2 * | 10/2006 | Silverbrook et al. | 235/472.01 |
| 7,197,174 | B1 * | 3/2007 | Koizumi | 382/139 |
| 2001/0023896 | A1 | 9/2001 | He Duanfeng et al. | |
| 2001/0038711 | A1 * | 11/2001 | Williams et al. | 382/181 |
| 2002/0000981 | A1 | 1/2002 | Hugosson et al. | |
| 2002/0018028 | A1 * | 2/2002 | Kadota | 345/5 |
| 2002/0020750 | A1 * | 2/2002 | Dymetman et al. | 235/472.01 |
| 2002/0028017 | A1 * | 3/2002 | Munich et al. | 382/187 |
| 2002/0071488 | A1 | 6/2002 | Kim et al. | |
| 2002/0128796 | A1 * | 9/2002 | Matsutani | 702/155 |
| 2002/0148655 | A1 | 10/2002 | Cho et al. | |
| 2002/0163510 | A1 | 11/2002 | Williams et al. | |
| 2002/0163511 | A1 | 11/2002 | Sekendur | |
| 2003/0063045 | A1 | 4/2003 | Fleming | |
| 2003/0063072 | A1 | 4/2003 | Brandenberg et al. | |
| 2003/0095708 | A1 * | 5/2003 | Pittel | 382/187 |
| 2004/0032393 | A1 | 2/2004 | Brandenberg et al. | |
| 2005/0128181 | A1 * | 6/2005 | Wang et al. | 345/156 |

FOREIGN PATENT DOCUMENTS

| | | |
|---|---|---|
| EP | 0 407 734 | 1/1991 |
| EP | 0439682 | 8/1991 |
| EP | 0 564 708 A | 10/1993 |
| EP | 0 694 870 A | 1/1996 |
| EP | 0 732 666 | 9/1996 |
| EP | 0 865 166 | 9/1998 |
| EP | 1 158 456 | 11/2001 |
| WO | WO 96/30217 | 10/1996 |
| WO | 00/25293 | 5/2000 |
| WO | 0073983 | 12/2000 |
| WO | WO 01/48685 | 7/2001 |
| WO | WO 01/71654 | 9/2001 |
| WO | WO 02/077870 | 10/2002 |

OTHER PUBLICATIONS

Frederick Jelinek, "Statistical Methods for Speech Recognition", 2001, pp. 1-283, extra pp. 13, total pp. of 296.*

K. S. Nathan, J. R. Bellegarda, D. Nahamoo, and E. J. Bellegarda, On-Line Handwriting Recognition Using Continuous Parameter Hidden Markov Models, 1993 IEEE.*

M. E. Munich, P. Perona, Visual Input for Pen-Based Computers, 2002 IEEE.*

M. Mohamed, and P. Gader, Handwritten Word Recognition Using Segmentation-Free Hidden Markov Modeling and Segmentation-Based Dynamic Programming Technique, IEEE 1996.*

B. K. Sin, and J. H. Kim, Ligature Modeling for Online Cursive Script Recognition, IEEE 1997.*

M. E. Munich, P. Perona, "Visual Input for Pen-Based Computers" 2002 IEEE, vol. 24, No. 3, Mar. 2002.*

Kai-Fu Lee, "Automatic Speech Recognition—The Development of the SPHINX System", Kluwer Academic Publishers, pp. 1-207, 1992.

Frederick Jelinek, "Statiscal Methods for Speech Recognition", The MIT Press, pp. 1-283, 2001.

Dumer et al., "Hardness of Approximating the Minimum Distance of a Linear Code", IEEE, pp. 475-484, 1999.

Clark et al., "Maximal and Near-Maximal Shift Register Sequences: Efficient Event Counters and Easy Discrete Logarithms", IEEE Transactions on Computers, vol. 43, No. 5, May 1994.

Grasso et al., "Augmenting Recommender Systems by Embedding Interfaces into Practices", pp. 267-275, 1999.

Moran et al., "Design and Technology for Collaborage: Collaborative Collages of Information on Physical Walls", Nov. 1999.

Fujieda et al., "Development Of Pen-Shaped Scanners", Nec, vol. 51, No. 10, 1998.

Crowley et al., "Things That See", Communications of the A.C.M., vol. 43, No. 3, pp. 54-64, Mar. 2000.

Ko et al., "Finger Mouse and Gesture Recognition System As A new Human computer Interface", Computer and Graphics, col. 21, No. 5, pp. 555-561, 1997.

Champaneria, "PADCAM: A Real-Time, Human-Centric Notetaking System", MIT Laboratory for Computer Science, Mar. 2002.

OTM Technologies, "VPEN—Revolutionizing Human Interaction With The Digital World™", pp. 1-6.

Internet Print Out: "N-Scribe For Digital Writing", Mobileinfo.com, News issue #2001-15 (Apr. 2001), http://www.mobileinfo.com/News_2001/Issue15/Digital-nscribe.htm, dated Jul. 15, 2002.

Internet Print Out: "Don't Break This Ink Pen", Edgereview.com, by Brian Urbanski, http://www.edgereview.com/ataglance.cfm?category=edge&ID=180, dated Jul. 15, 2002.

Internet Print Out: "DataGlyphs®: Embedding Digital Data", Parc Solutions, http://www.parc.com/solutions/dataglyphs/, dated Jul. 15, 2002.

Internet Print Out: "Navilite—Optical Opportunities—Bluetooth-enabled optical transition measurement technology paves the way for an untethered stylus that can write on any surface", vol. 8, Issue No. 34, Jul. 5-11, 2002, www.computerworld.com, dated Aug. 15, 2002.

Internet Print Out: "Competitive Technologies' Investee Introduces N-Scribe Pen—Digital Ink Presents Wireless Pen At Demo 2001", Competitive Technologies, http://www.competitivetech, dated Sep. 5, 2003.

Internet Print Out: "Jot This—Nscribe Pen", PC Magazine, http://www.pcmag.com/article2/0,4149,31650,00.asp, dated Jul. 15, 2002.

Internet Print Out: "RF Pen Sends Your Scribbles", Appliance Manufacturing Magazine, http://www.ammagazine.com. Dated Sep. 26, 2002.

Internet Print Out: "Nscribe pen And Presenter-To-Go—Infrared Pen And New Springboard Module Make Their Debut At Demo 2001", Edgereview.com, by Brian Urbanski, http://www.techtv.com/freshgear/pr, dated Sep. 5, 2003.

Internet Print Out: "Don't Break This Ink Pen", Edgereview.com, by Brian Urbanski, http://www.edgereview.com/ataglance.cfm?category=edge&ID=180, dated Sep. 5, 2003.

Internet Print Out: "*Preprocessing In the NPen++ System*", http://www.is.cs.cmu.edu/mie/multimodal_npen_preproc.html, dated Aug. 8, 2002.

Internet Print Out: "*OTM Technologies—V Pen*", searched http://www.otmtech.com/vpen3.asp, pp. 1-7.

Internet Print Out: "*Mimio—Products*", Mimio, http://www.mimio.com, pp. 1-8.

Internet Print Out: "*SMART Board Interactive Whiteboard*", Smarttech, http://www.smarttech.com, pp. 1-28.

Haynes, "*Wacom PL-500*", www.wacom.co.uk.

Internet Print Out: "*(Electro-Magnetic Resonance) send and position sensing technology*" Wacom, Technology, http://www.wacom-components.com/tech.asp, pp. 1-6.

Internet Print Out: "*Cordless Batteryless Pen*", Wacom Penabled, Components, http://www.wacom.com/components/index.cfm, dated Jul. 15, 2002.

Internet Print Out: "*PL-500—15.1 inch Screen Digital LCD Pen Tablet System*", Wacom Graphics Tablet Solution, http://ap.wacm.co.jp/products/pl/contents/pl500.html, pp. 1-13.

Internet Print Out: Digital Pens, http://www.anotofunctionality.com/navigate.asp?PageID=96, pp. 1-70.

European Search Report; Application No. 03021238.5-1527; Dated Jun. 1, 2005; Total pp. (6).

Dey, et al., "A Fast Algorithm for Computing the Euler Number of an Image and its VLSI Implementation", IEEE; 13th International Conference on VLSI Design (Jan. 2003).

Search Report dated Jun. 1, 2005 from European Patent Application No. 03021224.5.

European Office Action dated Mar. 10, 2006 from European Patent Application No. 03021238.5-1527.

* cited by examiner

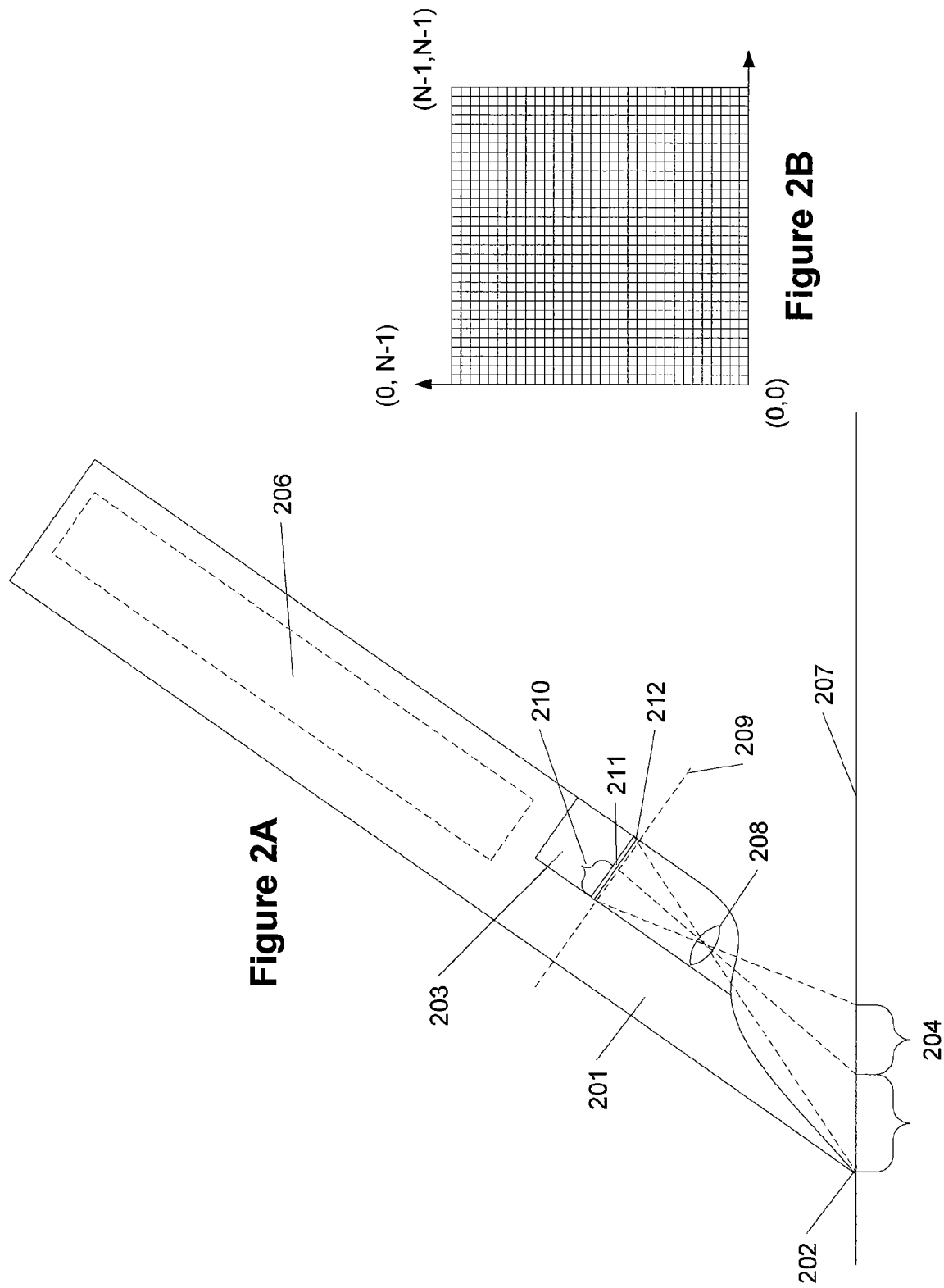

Figure 3A  0111 0000 0101 1101 1001 0111 1111 1000 1010
Figure 3B  01010111 0 110110010 001010011 111101100
Figure 3C  0101 1101 0011 1101 1001 1001 1110 0010
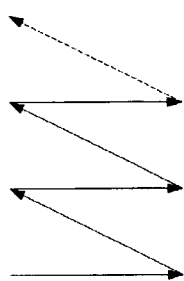
Figure 3D
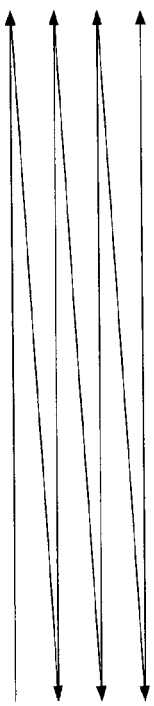
Figure 3E
Figure 3F

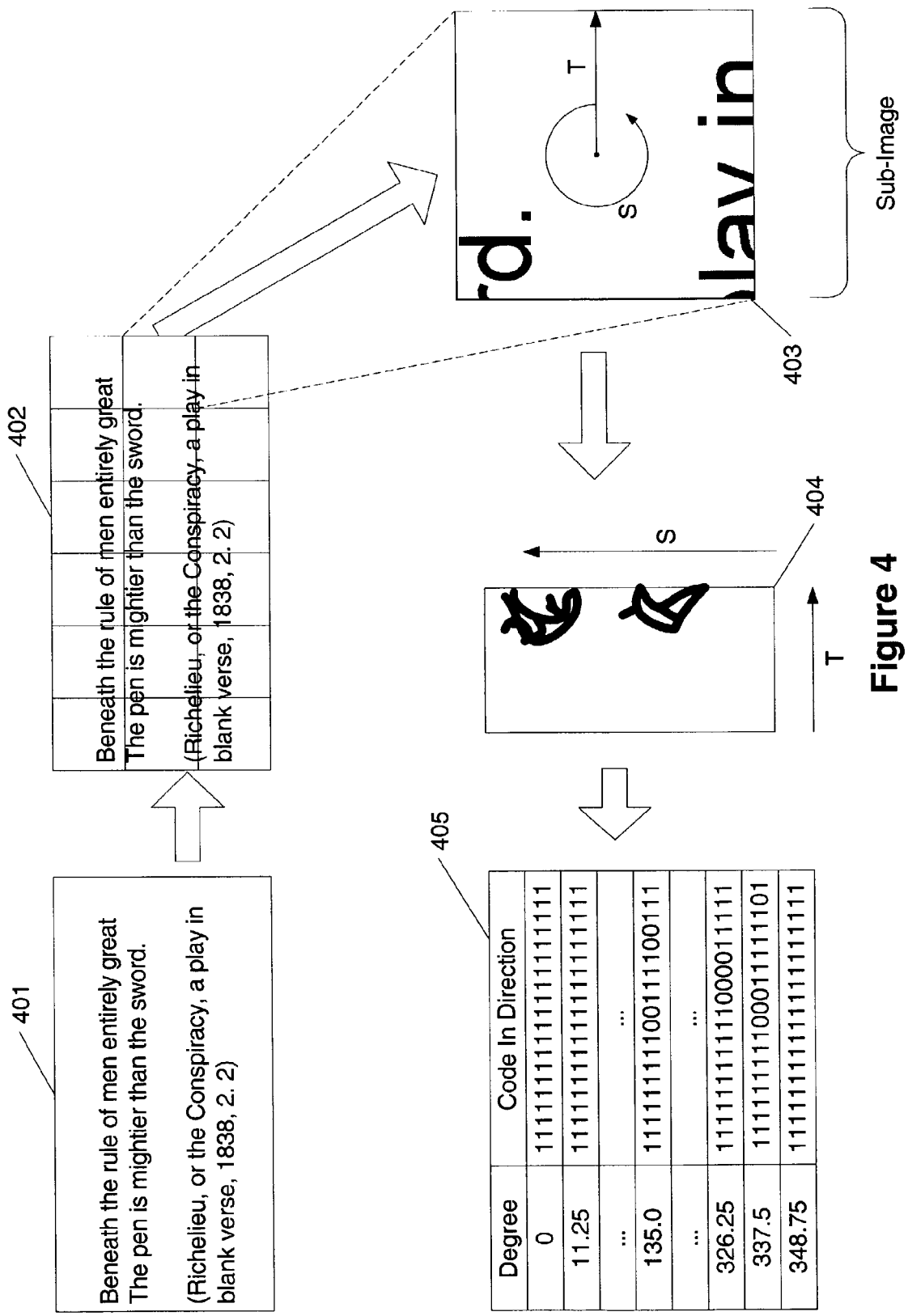

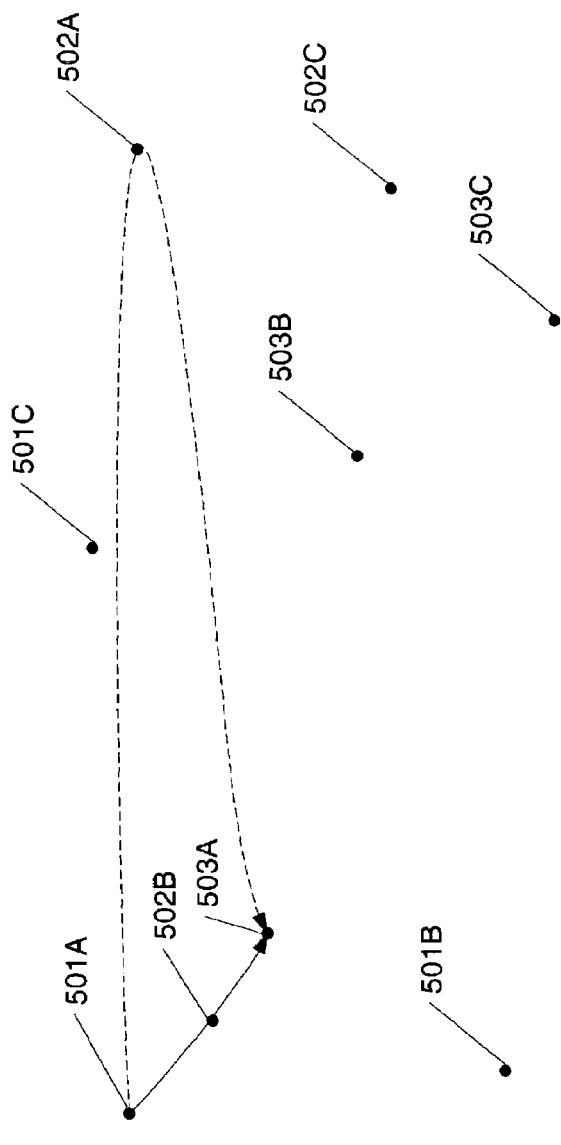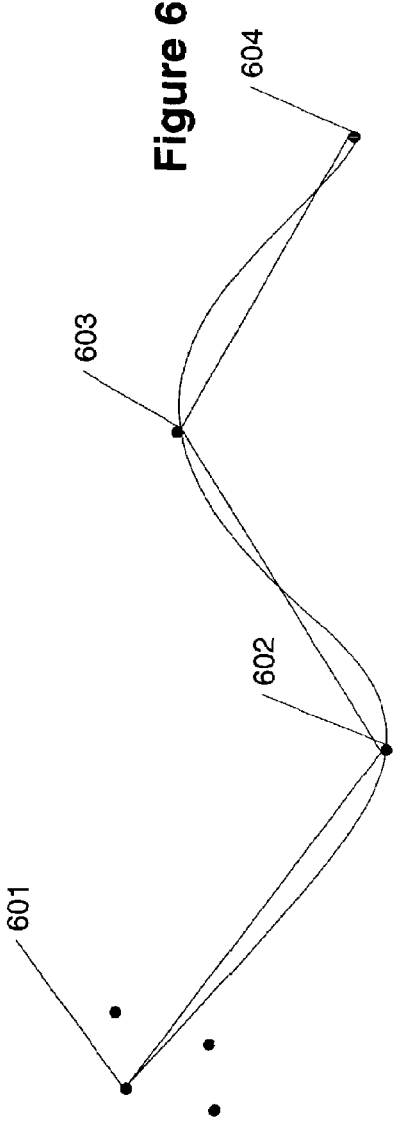

STATISTICAL MODEL FOR GLOBAL LOCALIZATION

TECHNICAL FIELD

The present invention relates to interacting with a medium using a digital pen. More particularly, the present invention relates to determining the location of a digital pen during interaction with one or more surfaces.

BACKGROUND

Computer users are accustomed to using a mouse and keyboard as a way of interacting with a personal computer. While personal computers provide a number of advantages over written documents, most users continue to perform certain functions using printed paper. Some of these functions include reading and annotating written documents. In the case of annotations, the printed document assumes a greater significance because of the annotations placed on it by the user. One of the difficulties, however, with having a printed document with annotations is the later need to have the annotations entered back into the electronic form of the document. This requires the original user or another user to wade through the annotations and enter them into a personal computer. In some cases, a user will scan in the annotations and the original text, thereby creating a new document. These multiple steps make the interaction between the printed document and the electronic version of the document difficult to handle on a repeated basis. Further, scanned-in images are frequently non-modifiable. There may be no way to separate the annotations from the original text. This makes using the annotations difficult. Accordingly, an improved way of handling annotations is needed.

Users are accustomed to writing on both blank paper and paper with preexisting content. For annotations from each of these surfaces to be represented electronically, one needs to determine the location of the pen for these different environments.

SUMMARY

Aspects of the present invention provide solutions to at least one of the issues mentioned above, thereby enabling one to locate a position or positions on a surface. The surface may include a printed image (or an image on a displayed computer image). Aspects of the present invention include various localization processes that permit efficient localization of a captured image, providing for efficient determination of the location of the image. These and other aspects of the present invention will become known through the following drawings and associated description.

BRIEF DESCRIPTION OF DRAWINGS

The foregoing summary of the invention, as well as the following detailed description of preferred embodiments, is better understood when read in conjunction with the accompanying drawings, which are included by way of example, and not by way of limitation with regard to the claimed invention.

FIGS. 2A and 2B show an image capture system and corresponding captured image in accordance with embodiments of the present invention.

FIGS. 3A through 3F show various sequences and folding techniques for encoding information in accordance with embodiments of the present invention.

FIG. 4 shows a process for encoding an image in accordance with embodiments of the present invention.

FIGS. 5 through 7 show the selections of probable paths of pen movement accordance with embodiments of the present invention.

DETAILED DESCRIPTION

Aspects of the present invention relate to determining the location of a captured image in relation to a larger image. Aspects of the present invention relate to minimizing the number of image sets that need to be searched. This reduction in search size improves the speed at which the path of a pen may be determined. The location determination method and system described herein may be used in combination with a multi-function pen.

The following is separated by subheadings for the benefit of the reader. The subheadings include: terms, general-purpose computer, image capturing pen, active codes, passive codes, path determinations, code grouping and path determination.

Terms

Pen—any writing implement that may or may not include the ability to store ink. In some examples, a stylus with no ink capability may be used as a pen in accordance with embodiments of the present invention.

Camera—an image capture system that may capture an image from paper, a computer display, or any other medium.

General Purpose Computer

Figure 1:
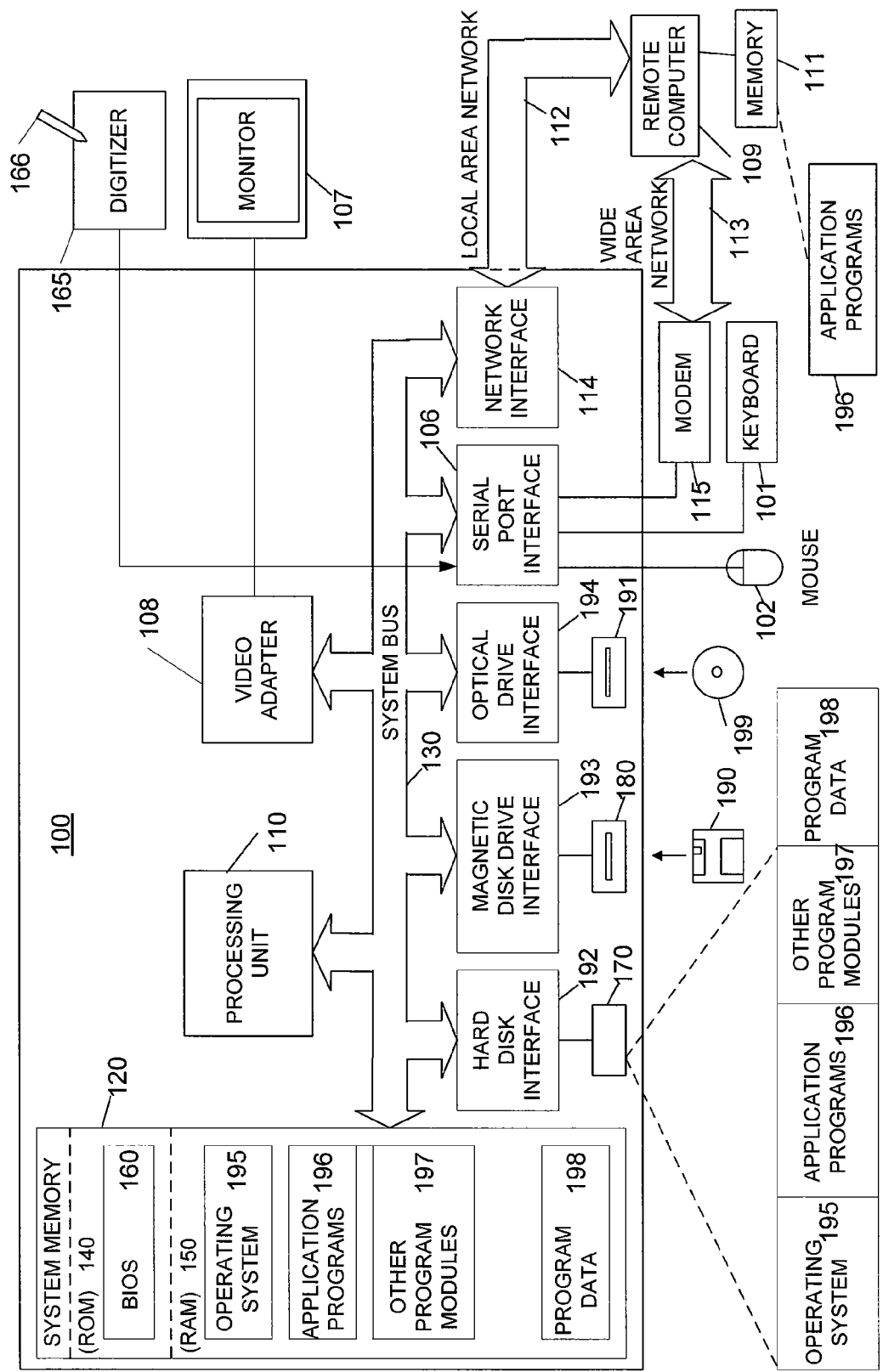
FIG. 1 shows a general description of a computer that may be used in conjunction with embodiments of the present invention.

FIG. 1 is a functional block diagram of an example of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 199 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 199, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the serial port is shown, in practice, the pen digitizer 165 may be coupled to the processing unit 110 directly, via a parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are illustrative and other techniques for establishing a communications link between the computers can be used. The existence of any of various well-known protocols such as TCP/IP, Ethernet, FTP, HTTP, Bluetooth, IEEE 802.11x and the like is presumed, and the system can be operated in a client-server configuration to permit a user to retrieve web pages from a web-based server. Any of various conventional web browsers can be used to display and manipulate data on web pages.

Image Capturing Pen

Aspects of the present invention include placing an encoded data stream in a displayed form. The displayed form may be printed paper (or other physical medium) or may be a display projecting the encoded data stream in conjunction with another image or set of images. For example, the encoded data stream may be represented as a physical encoded image on the paper or an encoded image overlying the displayed image or may be a physical encoded image on a display screen (so any image portion captured by a pen is locatable on the display screen).

This determination of the location of a captured image may be used to determine the location of a user's interaction with the paper, medium, or display screen. In some aspects of the present invention, the pen may be an ink pen writing on paper. In other aspects, the pen may be a stylus with the user writing on the surface of a computer display. Any interaction may be provided back to the system with knowledge of the encoded image on the document or supporting the document displayed on the computer screen. By repeatedly capturing the location of the camera, the system can track movement of the stylus being controlled by the user.

FIGS. 2A and 2B show an illustrative example of pen 201 with a camera 203. Pen 201 includes a tip 202 that may or may not include an ink reservoir. Camera 203 captures an image 204 from surface 207. Pen 201 may further include additional sensors and/or processors as represented in broken box 206. These sensors and/or processors 206 may also include the ability to transmit information to another pen 201 and/or a personal computer (for example, via Bluetooth or other wireless protocols).

FIG. 2B represents an image as viewed by camera 203. In one illustrative example, the field of view of camera 203 is 32×32 pixels (where N=32). Accordingly, FIG. 2B shows a field of view of 32 pixels long by 32 pixels wide. The size of N is adjustable based on the degree of image resolution desired. Also, while the field of view of the camera 203 is shown as a square for illustrative purposes here, the field of view may include other shapes as is known in the art.

The input to the pen 201 from the camera 203 may be defined as a sequence of image frames $\{I_i\}$, i=1, 2, . . . , A, where $I_i$ is captured by the pen 201 at sampling time $t_i$. The selection of sampling rate is due to the maximum motion frequency of pen tip, which may be the same as the frequency of the hand when one writes. The frequency is known as to be from 0 up to 20 Hz. By the Nyquist-Shannon sampling theorem, the minimum sampling rate should be 40 Hz, typically 100 Hz. In one example, the sampling rate is 110 Hz. The size of the captured image frame may be large or small, depending on the size of the document and the degree of exactness required. Also, the camera image size may be determined based on the size of the document to be searched.

The image captured by camera 203 may be used directly by the processing system or may undergo pre-filtering. This pre-filtering may occur in pen 201 or may occur outside of pen 201 (for example, in a personal computer).

The image size of FIG. 2B is 32×32 pixels. If each encoding unit size is 3×3 pixels, then the number of captured encoded units would be approximately 100 units. If the encoding unit size is 5×5, then the number of captured encoded units is approximately 36.

FIG. 2A also shows the image plane 209 on which an image 210 of the pattern from location 204 is formed. Light received from the pattern on the object plane 207 is focused by lens 208. Lens 208 may be a single lens or a multi-part lens system, but is represented here as a single lens for simplicity. Image capturing sensor 211 captures the image 210.

The image sensor 211 may be large enough to capture the image 210. Alternatively, the image sensor 211 may be large enough to capture an image of the pen tip 202 at location 212. For reference, the image at location 212 is referred to as the virtual pen tip. It is noted that the virtual pen tip location with respect to image sensor 211 is fixed because of the constant relationship between the pen tip, the lens 208, and the image sensor 211. Because the transformation from the location of the virtual pen tip 212 (represented by $L_{virtual-pentip}$) to the location of the real pen tip 202 (represented by $L_{pentip}$), one can determine the location of the real pen tip in relation to a captured image 210.

The following transformation $F_{S \to P}$ transforms the image captured by camera to the real image on the paper:

$$L_{paper} = F_{S \to P}(L_{Sensor})$$

During writing, the pen tip and the paper are on the same plane. Accordingly, the transformation from the virtual pen tip to the real pen tip is also $F_{S \to P}$:

$$L_{pentip} = F_{S \to P}(L_{virtual-pentip})$$

The transformation $F_{S \to P}$ may be referred to as a perspective transformation. This simplifies as:

$$F'_{S \to P} = \left\{ \begin{array}{ccc} s_x \cos\theta, & s_y \sin\theta, & 0 \\ -s_x \sin\theta, & s_y \cos\theta, & 0 \\ 0, & 0, & 1 \end{array} \right\}$$

as the estimation of $F_{S \to P}$, in which $\theta$, $s_x$, and $s_y$ are the rotation and scale of two orientations of the pattern captured at location 204. Further, one can refine $F'_{S \to P}$ to $F_{S \to P}$ by matching the captured image with the corresponding background image on paper. "Refine" means to get a more precise perspective matrix $F_{S \to P}$ (8 parameters) by a kind of optimization algorithm referred to as a recursive method. The recursive method treats the matrix $F'_{S \to P}$ as the initial value. $F_{S \to P}$ describes the transformation between S and P more precisely than $F'_{S \to P}$.

Next, one can determine the location of virtual pen tip by calibration.

One places the pen tip 202 on a known location $L_{pentip}$ on paper. Next, one tilts the pen, allowing the camera 203 to capture a series of images with different pen poses. For each image captured, one may receive the transform $F_{S \to P}$. From this transform, one can obtain the location of the virtual image of pen tip $L_{virtual-pentip}$:

$$L_{virtual-pentip} = F_{P \to S}(L_{pentip})$$

And, $$F_{P \to S} = 1/F_{S \to P}$$

By averaging the $L_{virtual-pentip}$ received from every image, an accurate location of the virtual pen tip $L_{virtual-pentip}$ may be determined.

The location of the virtual pen tip $L_{virtual-pentip}$ is now known. One can also obtain the transformation $F_{S \to P}$ from image captured. Finally, one can use this information to determine the location of the real pen tip $L_{pentip}$:

$$L_{pentip} = F_{S \to P}(L_{virtual-pentip})$$

Active Codes

One may insert information into a document (or added as an image or on the display of a computer) to aid in determination of a pen's location. The information may be a two-dimensional array in which each sub-array of a given size is unique.

A two-dimensional array may be constructed by folding a one-dimensional sequence. Any portion of the two-dimensional array may be used to determine its location in complete two-dimensional array. One concern is that the image portion captured by a camera is limited in size. Accordingly, one needs to be able to determine the location from the captured image or a few captured images. Additional complications arise in that errors present in the captured image may compromise the availability of some points in the captured image. So as to minimize the possibility of a captured image portion being associated with two or more locations in the two-dimensional array, a non-repeating sequence may be used to create the array. One property of a created sequence is that the sequence does not repeat over a length (or window) n. The following describes the creation of the one-dimensional sequence then the folding of the sequence into an array.

Sequence Construction

A sequence of numbers may be used as the starting point of the encoding system. For example, a sequence (also referred to as an m-sequence) may be represented as a q-element set in field $F_q$. Here, $q=p^n$ where $n \geq 1$ and where p is a prime number. The sequence or m-sequence may be generated by a variety of different techniques including, but not limited to, polynomial division. Using polynomial division, the sequence may be defined as follows:

$$\frac{R_l(x)}{P_n(x)} \quad (1)$$

where $P_n(x)$ is a primitive polynomial of degree n in field $F_q[x]$ (having q elements). $R_l(x)$ is a nonzero polynomial of degree l (where l<n) in field $F_q[x]$. The sequence may be created used an iterative procedure using two steps: first, dividing the two polynomials (resulting in an element of field Fq) and, second, multiplying the remainder by x. The computation stops when the output begins to repeat. This process may be implemented using a linear feedback shift register as set forth in an article by Douglas W. Clark and Lih-Jyh Weng, "Maximal and Near-Maximal Shift Register Sequences: Efficient Event Counters and Easy Discrete Logarithms," IEEE Transactions on Computers 43.5 (May 1994, pp 560-568). In this environment, a relationship is established between cyclical shifting of the sequence and polynomial $R_l(x)$: changing $R_l(x)$ only cyclically shifts the sequence and every cyclical shifting corresponds to a polynomial $R_l(x)$. One of the properties of the resulting sequence is that, over a width (or length) n, any portion exists once in the sequence.

The process described above is but one of a variety of processes that may be used to create a non-repeating sequence.

Array Construction

The array (or m-array) that may be used to create the image (of which a portion may be captured by the camera) is an extension of the one-dimensional sequence or m-sequence. Let A be an array of period $(m_1, m_2)$, namely $A(k+m_1, l) = A(k, l+m_2) = A(k, l)$. When an $n_1 \times n_2$ window shifts through a period of A, all the nonzero $n_1 \times n_2$ matrices over $F_q$ appear once and only once. This property may be referred to as a "window property" in that each window is unique. A may then be expressed as an array of period (m1,m2) (with $m_1$ and $m_2$ being the horizontal and vertical number of bits present in the array) and order (n1, n2).

A binary array (or m-array) may be constructed by folding the sequence. One approach is to obtain a sequence then fold it to a size $m_1 \times m_2$ where the length of the array is $L = m_1 \times m_2 = 2^n - 1$. Alternatively, one may start with a predetermined size of the space one wants to cover (for example, one sheet of paper, 30 sheets of paper or the size of a computer monitor), determine the area $(m_1 \times m_2)$, then use the size to let and $L \geq m_1 m_2$, where $L = 2^n - 1$.

A variety of different folding techniques may be used. For example, FIGS. 3A through 3C show three different sequences. Each of these may be folded into the array shown as FIG. 3D. The three different folding methods are shown as the overlay in FIG. 3D and as the raster paths FIGS. 3E and 3F. The folding method as shown in FIG. 3D may be expressed as when $\gcd(m_1, m_2) = 1$ where $L = 2^n - 1$.

To create the folding method as shown in FIG. 3D, one creates a sequence $\{a_i\}$ of length L and order n. Next, an array $\{b_{kl}\}$ of size $m_1 \times m_2$ is created from the sequence $\{a_i\}$ by letting each bit of the array be calculated as shown by equation 2:

$$b_{kl} = a_i \qquad (2)$$

where, $k = i \bmod(m_1)$, $l = i \bmod(m_2)$, $i = 0, \ldots, L-1$.

This folding approach may be alternatively expressed as laying the sequence on the diagonal of the array, then continuing from the opposite side when an edge is reached.

Candidate Search for Active Codes

The code in an image captured by camera 203 may be obtained and correlated with the original bit stream used to create image. The correlation may be performed in a number of ways. For example, it may be performed by a recursive approach in which a recovered bit stream is compared against all other bit stream fragments within the original bit stream. Second, a statistical analysis may be performed between the recovered bit stream and the original bit stream, for example, by using a hamming distance between the two bit streams. It is appreciated that a variety of approaches may be used to determine the location of the recovered bit stream within the original bit stream.

Once one has the recovered bits, one needs to locate the captured image within the original array (for example, the one shown in FIG. 3D). The process of determining the location of a segment of bits within the entire array is complicated by a number of items. First, the actual bits to be captured may be obscured from ideal capture by the camera (for example, the camera may capture an image with handwriting that obscures the original code). Second, dust, creases, reflections, and the like may also create errors in the captured image. These errors make the localization process more difficult. In this regard, the image capture system may need to function with non-sequential bits extracted from the image. The following represents a method for operating with non-sequential bits from the image.

First, looking only at the sequence, let the sequence (or m-sequence) I correspond to the power series $I(x) = 1/P_n(x)$. Also, $R(x) = r_0 + r_1 x + r_2 x^2 + \ldots + r_{n-1} x^{n-1}$ is any nonzero polynomial whose degree is less than n. Sequence R corresponds to $R(x)/P_n(x)$. As mentioned above, R is a shifted version of I. A distance D is defined as the distance between I and R. This may be represented as $D(R) = s$ if R is the s-th shift of I. This distance D may be computed using a number of different techniques. One technique is by determining the Hamming distance between the two. Another method is by using the Pohlig-Hellman-Silver algorithm as noted by Douglas W. Clark and Lih-Jyh Weng, "Maximal and Near-Maximal Shift Register Sequences: Efficient Event Counters and Easy Discrete Logarithms," IEEE Transactions on Computers 43.5 (May 1994, pp 560-568). Other distance determining techniques as known in the art may also be used. Using the Pohlig-Hellman-Silver algorithm, $R(x) \equiv x^s \bmod(P_n(x))$.

However, attempting to compute a distance using the folded sequence is more complex as the codes extracted may be non-consecutive and may further include errors. Starting with the above sequence analysis, one may determine a location from an image. One may start with the following relation:

$$R = r^t A \qquad (3)$$

where, $r = (r_0 \ r_1 \ r_2 \ \ldots \ r_{n-1})^t$, and $A = (I \ T(I) \ \ldots \ T^{n-1}(I))^t$ consists of the cyclic shifts of I. Accordingly, any cyclic shift of I is the product of $r^t$ and A. If the pen reads k bits $(b = (b_0 \ b_1 \ b_2 \ldots b_{k-1})^t$ where $(k \geq n)$ of I), $R(x)$ may be used to cyclically shift $b_0$ to the beginning of the sequence (or m-sequence). This shifting then adjusts the columns of A to create a n×k sub-matrix M of A. Hence, $$r^t M = b^t \qquad (4)$$

If all the rows of M are independent, r may be determined and D(R) resulting in the absolute position of $b_0$ in I by modulating the one-dimensional locations of equation (1). This means that the two-dimensional location of the $b_0$ bit may be determined. This position information permits the location of the pen tip to be determined.

Next, all modulations of A may be determined and checked.

Alternatively, because matrix A is large, not all modulations of A need to be retained. In fact, in some implementations, only relative positions between the columns are relevant. Thus, the columns that may be saved (after shifting $b_0$ to the beginning of the sequence (or m-sequence)) are those whose corresponding two-dimensional positions are within the reception field of the camera when the pen (and thus the camera) rotates. The total number of such columns is much smaller than L (where $L = 2^n - 1$). If b is error-free, the solution of r may be expressed as:

$$r^t = \tilde{b}^t \tilde{M}^{-1} \qquad (5)$$

where $\tilde{M}$ is any non-degenerate n×n sub-matrix of M and $\tilde{b}$ is the corresponding sub-vector of b.

Passive Codes

Another type of coding is referred to herein as passive coding. Passive coding relates to using image portions from a larger image to determine the location of a pen. A number of different passive coding techniques are possible including storing all (or most) portions of an image and correlating images captured with a camera against these stored portions. Other techniques include reducing the size of the stored portions and using the reduced size versions to determine the location of the pen. The following description relates to coding an image about a center point and is shown with respect to FIG. 4. This coding process may also be referred to as radial coding.

Image Encoding for Passive Codes

As shown in FIG. 4, an image 401 is received and parsed into sub-images in step 402. In 403, the sub-image is sampled by rotating vector T about center of the sub-image in direction S. The encountered information in the sub-image of 403 is represented by unwrapped image 404. In other words, the sub-image block of 403 is sampled in polar coordinates.

The center pixel (or region) of the sub-image in 403 is treated as the origin, the sampling angle is S, and the magnitude of the sampling vector is T. For a 32 by 32 pixel region, S=32 and T=16.

For each sampling point (t, s), t=0, 1, ..., T−1, s=0, 1, ..., S−1, its position in Cartesian coordinate is $(x_{t,s}, y_{t,s})$, where $x_{t,s}$ and $y_{t,s}$ are represented by Equations 6 and 7, respectively.

$$x_{t,s} = t\frac{N}{2T}\cos\left(s \cdot \frac{2\pi}{S}\right) \quad (6)$$

$$y_{t,s} = t\frac{N}{2T}\sin\left(s \cdot \frac{2\pi}{S}\right) \quad (7)$$

The gray level value of point (t, s) is represented by equation 8, $$G_{t,s} = F(x_{t,s}, y_{t,s}) \quad (8)$$

where F is a 2-D Gaussian filter represented by equation 9.

$$F(x, y) = \frac{\sum_{i=-q}^{q}\sum_{j=-q}^{q} e^{\frac{-(([x]+i-x)^2+([y]+j-y)^2)}{\sigma^2}} P[x]+i, [y]+j)}{\sum_{i=-q}^{q}\sum_{j=-q}^{q} e^{\frac{-(([x]+i-x)^2+([y]+j-y)^2)}{\sigma^2}}}, \quad (9)$$

where P(x, y) means the gray level value of the pixel in position (x, y); the brackets "[ ]" means the nearest integers of a real value; σ and q are the filter parameters.

A codebook may be stored that compares various images against each other.

These comparisons may be used to locate a new image against the pre-stored images.

As polar coordinates are used to analyze the sub-image block as shown in 403, the resulting analysis has a higher degree of robustness in handling rotation differences between the camera frame and the sub-images. The rotation of camera image to be compared with the information in a codebook is not a complex issue as rotation of the captured camera image translates to shifting of the image in 404.

The image in 404 may be converted to its binary representation for each angle S across vector T as shown in table 405. The degree is the value 2π·s/S as s ranges from 0 to S−1. The image or sub-images (401, 402, 403, and 404) may be converted at a number of locations to a binary (black and white) image, if not previously converted to binary image when initially scanned, received or captured.

The grey level value matrix $\{G_{t,s}\}$ (where t=0, 1, ..., T−1, s=0, 1, ..., S−1) may be converted to a binary matrix $C_I^{rad}$ (as shown in equation 10) by applying a threshold to the values in the grey level matrix.

$$C_I^{rad} = \begin{bmatrix} c_{11} & \cdots & c_{1T} \\ \vdots & \ddots & \vdots \\ c_{S1} & \cdots & c_{ST} \end{bmatrix} \quad (10)$$

This code may then be compiled into a codebook with information relating to the location of the sub-images in the larger image.

To determine the location of a camera image with the different codes in the codebook, one may determine the distance between the camera image and the other code representations. The smallest distance or set of smallest distances to candidates may represent the best choice of the various locations. This distance may be computed by the hamming distance between the camera image and the current sub-images.

As set forth above, the distance from the captured image from the camera may be compared with one or more the code segments from the codebook. At least two types of distance may be used for the radial code: common hamming distance and rotation-invariant distance. Other distance determinations may be used.

The common hamming distance may be used as represented in equation 11 to determine the distance between a codebook code and a code associated with a camera image.

$$Dist^{ham}(C_1, C_2) = Ham(C_1, C_2) \quad (11)$$

Another type of distance that may be used includes a rotation-invariant distance.

The benefit of using a rotation invariant distance is that the rotation of the camera is addressed as shown in equation 12.

$$Dist^{r-i}(C_1, C_2) = \min_{d=0, \ldots, S-1}(Ham(C_1, Rot(C_2, d))) \quad (12)$$

where Rot($C_I^{rad}$, d) is defined as set forth in equation 13.

$$Rot(C_I^{rad}, d) = \begin{bmatrix} c_{d+1,1} & \cdots & c_{d+1,T} \\ \vdots & \ddots & \vdots \\ c_{S,1} & \cdots & c_{S,T} \\ c_{1,1} & \cdots & c_{1,T} \\ \vdots & \ddots & \vdots \\ c_{d,1} & \cdots & c_{d,T} \end{bmatrix} \quad (13)$$

Codebook Generation for Passive Codes

The codebook stores the codes relating to sub-images taken from an image and associated with their locations in the image. The codebook may be created before capturing images with camera 203. Alternatively, the codebook may be created or at least augmented during use. For example, the camera may pick up images during operation. If the user only writes on existing information, then the codebook may be used as presently described to determine the location of the image captured by the camera. However if the user writes over new annotations, the codebook will not be as correct as it could be. Accordingly, when new annotations are added by pen 201, these annotations may be incorporated back into the codebook so future annotations will be more accurately correlated with their on-screen representation.

Codebook generation may be as follows. The sub-images (for example, 403) are encoded by an encoding method. Next, the position-code pairs are organized to create the codebook. At least two types of organization methods may be used to create the codebook. Of course other methods may be used to create the codebook as well. These two methods are given as illustrative examples only.

The first method is to place the position-code pairs into a linear list in which each node contains a code and a position sequence where all positions are mapped to the code. The code book then may be represented as equation 14:

$$\Omega = \{\psi_i, i=1, 2, \ldots, N_\Omega\} \quad (14)$$

where $\psi$ is defined as $\psi = \{C_\psi, P_\psi\}$, $P_\psi$ is the set of all positions in the document bitmap where its code is C is shown in equation 15:

$$P_\psi = \{p_I | \text{the code at position pi is } C_\psi, i=1, 2, \ldots\} \quad (15)$$

Next, the set $\Omega$ may be sorted by the code of each member $\psi$ alphabetically, and then the codebook of the linear list type is obtained.

Figure 8A:
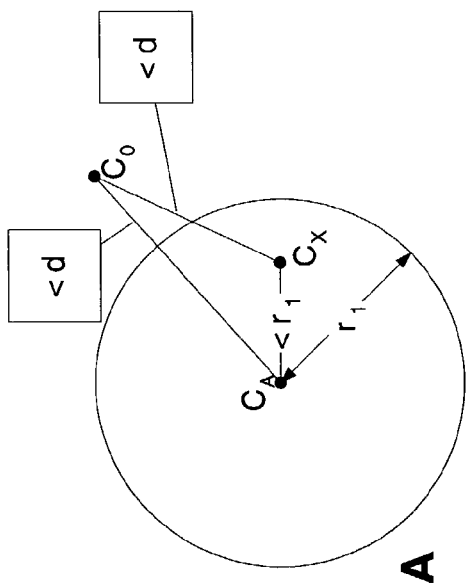
FIGS. 8A and 8B show determination of groups of codes in accordance with embodiments of the present invention.

The second method is to place the codes with their corresponding locations into a binary tree. The binary tree may be based on the Hamming distance between codes as represented by FIGS. 8A and 8B and 9.

For all codes, a code $C_O$ is compared against code $C_A$. All codes within a given distance of $C_A$ are grouped into a code set centered about $C_A$. As shown in FIG. 8A, the distance is radius $r_1$. Here, code $C_X$ is within the radius but code $C_O$ is not. However, so as to account for some small errors or to ensure that all codes fall cleanly into code group $C_A$ (or group $C_B$ as shown in FIG. 8B), a small distance d may be added to $r_1$.

Figure 8B:
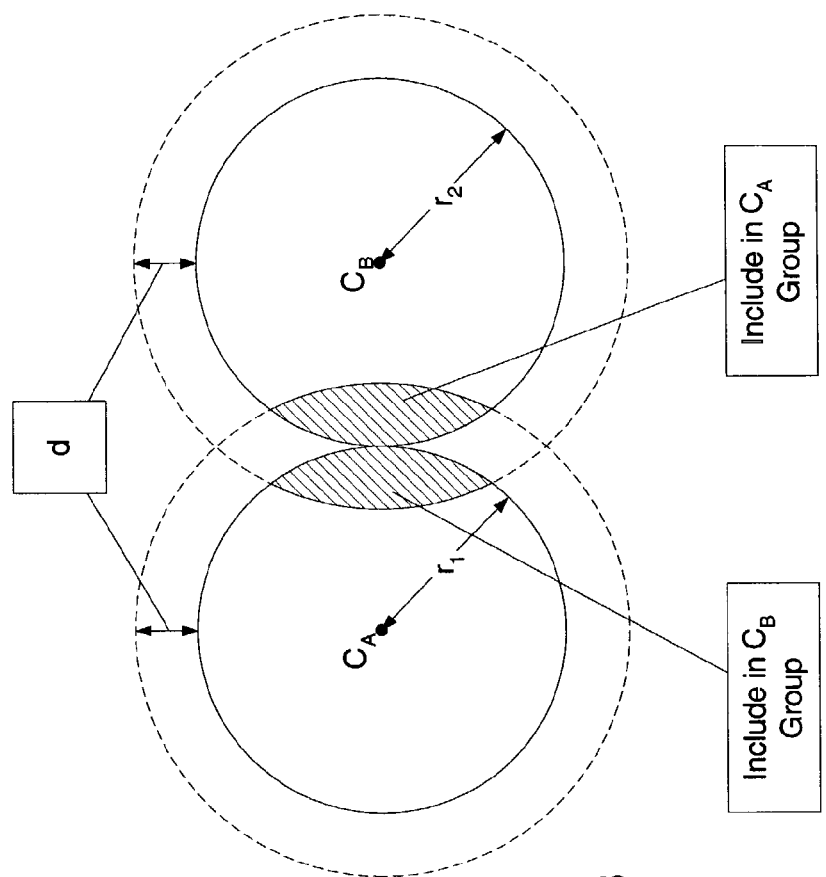

FIG. 8B shows two code sets centered on $C_A$ and $C_B$, respectively. In a first example, some codes centered about group $C_A$ may be grouped additionally with the group centered about $C_B$. Alternatively, only one group may be dominant (in that one group does not include additional distance d in determining which codes are in its group.

Figure 9:
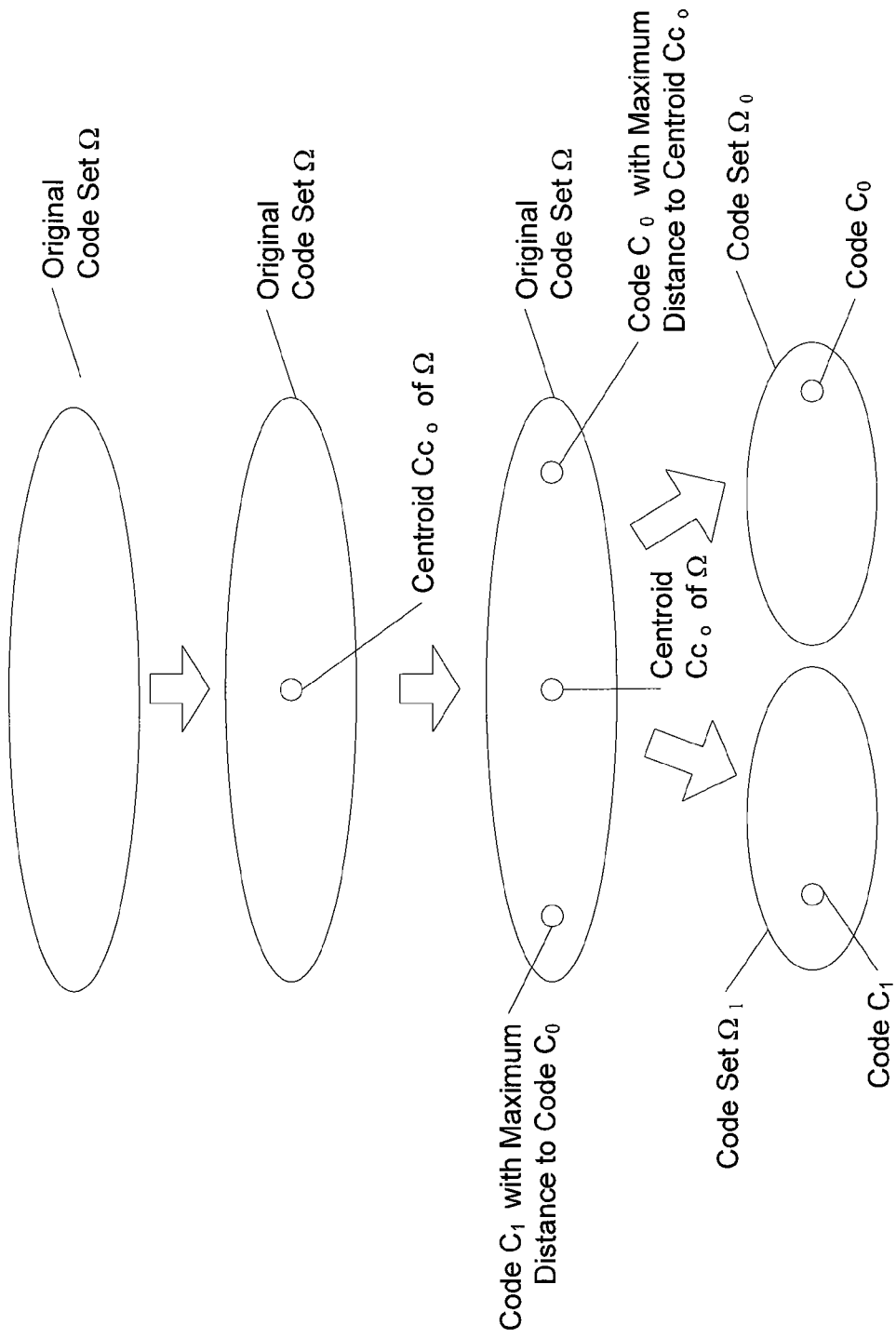
FIG. 9 shows the separation of codes into groups in accordance with embodiments of the present invention.

Referring to FIG. 9, first, the centroid $Cc_0$ of the total code set $\Omega$ is found. Next, the code $C_0$ with the maximum hamming distance to the centroid $Cc_0$ is found. Next, the code $C_1$ with the maximum distance to code $C_0$ is found.

The code set C is then split into two subsets: $\Omega_0$ and $\Omega_1$. The contents of $\Omega_0$ may be represented by equation 16 and the contents of $\Omega_1$ represented by equation 17.

$$\Omega_0 = \{\psi_I | \text{Dist}(C_{\psi_i}, C_0) < \text{Dist}(C_{\psi_i}, C_1)\} \quad (16)$$

$$\Omega_1 = \{\psi_i | \psi_i \notin \Omega_0\} \quad (17)$$

Next, for subsets $\Omega_0$ and $\Omega_1$, the steps of founding the centroid, finding the code with the maximum distance to the centroid, finding the code with the maximum distance to the code farthest away from the centroid, then splitting the subset is repeated until the number of members of the subset is 1.

Candidate Search for Passive Codes

The position candidates for a captured frame from the camera may be determined by searching the codebook. For each camera captured frame Ii, the candidate positions of the pen tip 202 may be determined as follows:

the frame Ii from the camera is encoded with the same encoding method used to generate the codebook;

the encoded frame $E_{Ii}$ is compared with the information in the codebook. The distance between the encoded frame $E_{Ii}$ and the encoded information in the codebook is determined. The encoded information in the codebook with the smallest distance to the encoded frame $E_{Ii}$ is used as the position candidate or one of the position candidates. Of these candidates, the best match is chosen.

The choice for best candidates may include a number of different analyses. First, the candidate most closely matching (minimum distance to code $E_{Ii}$) may be selected. Alternatively, the most recent set of candidates may be compared with the recent sequence of candidates and compare the frames over time. The resultant comparison should result in a series of position locations that are closest to each other. This result is expected as it indicates that the pen tip moved as little as possible over time. The alternative result may indicate that the pen tip jumped around the page in a very short time (which is less probable).

For searching the codebook, the following may be used. For each captured image I, with code $C_I$, the best matched code set $S(C_I)$ is defined as equation 18.

$$S(C_I) = \{\psi_i | \text{Dist}(C_I, C_{\psi_i}) < d_{thresh}, \psi_i \in \Omega, i=1, \ldots, N_s\} \quad (18)$$

if the radial code is used, the distance function should be $\text{Dist}^{r-i}(.,.)$.

Only $N_{thresh}$ codes with less distance in $S(C_I)$ are kept, if $N_s > N_{thresh}$. $d_{thresh}$ and $N_{thresh}$ are selected based on the camera performance.

The set of position candidates for image I may be represented by equation (19).

$$P_I = \bigcup_{i=1}^{N_I} P_{\psi_i}, \psi_i \in S(C_I) \quad (19)$$

Path Determination

The most straightforward way to match captured images with the larger image is to compare each image with every other sub-image in the larger image. However, this creates an extreme number of searches that need to be performed for each image. Aspects of the present invention are directed to minimizing the number of comparisons that need to be made.

Also, all position candidates may be used to determine a position of a path. Alternatively, only some of the position candidates may be used to determine a path. FIG. 5 shows this approach. Three sets of candidates are shown. Points 501A-501C are candidates from a first image, points 502A-502C are candidates from as second image, and points 503A-503C are candidates from a third image. If the primary point in each set was chosen (501A, 502A, and 503A), the path would be represented as dotted line path 501A-502A-503A. However, point 502A may be errant. A greater probability exists that the pen moved only a short distance, resulting in path 501A-502B-503A. Because it is more probable that the pen moved a shorter distance, the selected path would be path 501A-502B-503A.

FIG. 6 shows line segments connecting points 601, 602, 603 and 604. These points may be combined into a curve (shown superimposed on the straight line segments) that represent the path of the pen.

Aspects of the present invention relate to reducing the number of search candidates as a two part process: first, the larger image (or document) is segmented into small K*K blocks. Second, a statistical model is built to represent the relationship among these blocks. Thus, the combinations of these blocks are constrained by the proposed statistical model. This reduction in the number of search possibilities improves the throughput of the search system. This is important as more images are captured by the camera.

Next, the candidates generated from the results of the active code analysis and the passive code analysis may be combined and the results analyzed to determine the path of the pen. Two models may be created and applied to determine the path of the pen. The two models include a "capture error model" and a "handwriting model." These models may be trained from training data (variables determined and modified). For example, a similarity measurement approach may be used to represent $Pr(i_k|l_k)$ to provide training data for the capture error model. For instance, one may use the correlation coefficient between $i_k$ and $i_{f(l_k)}$. Finally, the resulting path of a pen may be determined by using Bayesian analysis techniques.

The handwriting model is based on the work of statistical language modeling.

Here, a statistical n-gram model is used to model the space and motion relationship among sequential blocks learned by monitoring a user. Two algorithms may be used. First, a bigram model may be used, which uses the distance between sequential blocks to model a spatial relationship between the blocks. Next, a trigram model may be used, which is based on a handwriting model created from the user. These models may be combined and used to find the location of captured images.

The inputs and outputs of the image capturing system and path locating may be represented as follows:

Input: $I=(i_1,i_2,\ldots,i_n)$, where $i_k$ is the kth image which captured by the camera;

Output: $L=(l_1,l_2,\ldots,l_n)$, where $l_k$ is the 2D position for the image $i_k$.

Goal: $\hat{L}=\text{argmax}_L \text{ max} Pr(L|I)$, i.e. to find most possible sequence of 2D points $\hat{L}$, which maximize $Pr(L|I)$.

This relationship may be recast with Bayes law as Eq. (20).

$$\text{argmax}_L Pr(L|I) = \text{argmax}_L \frac{Pr(I|L)Pr(L)}{Pr(I)} = \text{argmax}_L Pr(I|L)Pr(L) \qquad (20)$$

Next, the problem is separated into two parts: capture error model $Pr(I|L)$ and handwriting model $Pr(L)$. Conceptually, all L's are enumerated, and the one that gives the largest $Pr(L|I)$ is selected as the best sequence. In practice, some efficient methods, such as a Viterbi search may be used. In one example, a Viterbi Beam search may be used to improve the speed of the search.

The handwriting model, found in Eq. (20), $Pr(L)$ measures the a priori probability of a 2D positions sequence. Generally, $Pr(L)$ may be determined by a statistical language model (SLM) (such as the bigram or trigram approach mentioned above). The capture error model $Pr(I|L)$ measures the probability that image block in location L is captured as image I.

The image captured by the pen's camera is relatively small. Generally, the size of the segmented blocks K*K may be constrained to be similar to the capture size of the camera. Alternatively, the image capture size of the camera may be adjusted to approximately the K*K division size of the larger image. Using this analysis, one may divide the original document into small blocks of K*K size. Next, the captured image sequence I may be represented as the combination of small image blocks, i.e. $i_1, i_2, \ldots, i_n$. Assuming that the capture error is independent, the error capture model may be represented as Eq. (21).

$$Pr(I|L) \approx \prod_{k=1}^{n} Pr(i_k|l_k) = \prod_{k=1}^{n} Pr(i_k|I_{f(l_k)}), \qquad (21)$$

Where, $I_{f(l_k)}$ is the original image block in location $l_k$.

The image block may be too large to actually store and use efficiently. Accordingly, some features may be extracted to represent the image block. This provides two benefits. First, the representation storage greatly reduces the amount of information. Second, the pen locating system becomes more robust as representing only features reduces noise to some extent. This feature extraction may mirror the passive coding approach set forth above.

To obtain a feature set for a block, the entire document is converted into a black-white image and the image is divided into K*K small blocks. For each small block, the image is projected in the X & Y axis directions. If the projection to X/Y direction is all 0, then this point is coded as a 0, otherwise, the point (center point) is we can code this point as 0; otherwise, this point is coded as 1. Then, the code for X & Y axis can be combined to represent the block. For example, the black-white image block is represented as Eq. (22); then, the code for this block is represented as Eq. (23).

$$i = \begin{bmatrix} i_{11} & \cdots & i_{1K} \\ \vdots & \ddots & \vdots \\ i_{K1} & \cdots & i_{KK} \end{bmatrix} \qquad (22)$$

where, $i_{jk}$ is one pixel in the point (j,k) of the image block i. The two possible values for $i_{jk}$ are 0 or 1, 0 means white, and 1 means black.

$$C(i) = \lfloor c_{1x}, \cdots, c_{Kx}, c_{1y}, \cdots, c_{Ky} \rfloor \qquad (23)$$
$$c_{jx} = c_{1j} \& c_{2j} \& \cdots \& c_{Kj}$$
$$c_{jy} = c_{j1} \& c_{j2} \& \cdots \& c_{jK}$$

where, $c_{jx}$ is the code projection on x axis, and $c_{jy}$ is the code projection on y axis.

After the coding, the capture error model is rewritten as Eq. (24).

$$Pr(I|L) \approx \prod_{k=1}^{n} Pr(i_k|l_k) = \prod_{k=1}^{n} Pr(i_k|I_{f(l_k)}) = \prod_{k=1}^{n} Pr(C(i_k)|C(i_{f(l_k)})) \qquad (24)$$

Comparisons may be made for all the blocks. Alternatively, in order to speed up the calculation, one may pre-calculate all the possible confusion codes and store them into a table for future usage.

The handwriting model $Pr(L)$ as found in Eq. (20) may be determined by a statistical language model (SLM), such as bigram or trigram language model as follows.

L may be represented by a sequence of 2D points $l_1, l_2, \ldots, l_n$. The handwriting model then may be represented as Eq. (25).

$$Pr(L) = Pr(l_1 l_2 \cdots, l_n) = Pr(l_1) \prod_{k=2}^{n} Pr(l_k | l_1 \cdots l_{k-1}) \quad (25)$$

In the bigram model, one can make the assumption that one location $l_k$ is only constrained by a previous location $l_{k-1}$. Based on this assumption, the handwriting model may be rewritten as Eq. (26).

$$Pr(L) = \quad (26)$$
$$Pr(l_1 l_2 \cdots, l_n) = Pr(l_1) \prod_{k=2}^{n} Pr(l_k | l_1 \cdots l_{k-1}) \approx Pr(l_1) \prod_{k=2}^{n} Pr(l_k | l_{k-1})$$

Further, by the fact that the sampling rate for the camera is relatively fast compared to the movement of the pen, one can approximate the pen speed to be effectively zero and the dislocation of the pen from the previous position meets with Gauss distribution.

Thus, the page handwriting model provides a solid tool for estimating the probability of a pen's location based on a previous location. In other words, the smaller the distance moved, the higher the probability of determining the location of the pen at a new location. The handwriting model may then be rewritten as Eq. (27). This model assumes that adjacent captured images fall into a small circle.

$$Pr(L) = Pr(l_1) \prod_{k=2}^{n} Pr(l_k | l_{k-1}) = Pr(l_1) \prod_{k=2}^{n} p_k \text{ where,} \quad (27)$$

$$p_k = \frac{1}{\sqrt{2\pi} \cdot \sigma_{x1}} e^{-\frac{[x_k - x_{k-1} - \mu_{x1}]^2}{2\sigma_{x1}^2}} \cdot \frac{1}{\sqrt{2\pi} \cdot \sigma_{y1}} e^{-\frac{[y_k - y_{k-1} - \mu_{y1}]^2}{2\sigma_{y1}^2}},$$

and $l_k = (x_k, y_k)$.

Further, to take into account acceleration of the pen during writing, a trigram model may be used. Using the trigram model, the page handwriting model may be rewritten as Eq. (28).

$$Pr(L) = Pr(l_1) \prod_{k=2}^{n} Pr(l_k | l_{k-2} l_{k-1}) = Pr(l_1) \prod_{k=2}^{n} p_k \text{ where,} \quad (28)$$

$$p_k = \frac{1}{\sqrt{2\pi} \cdot \sigma_{x2}} e^{-\frac{[(x_k - x_{k-1}) - (x_{k-1} - x_{k-2}) - \mu_{x2}]^2}{2\sigma_{x2}^2}} \cdot$$

$$\frac{1}{\sqrt{2\pi} \cdot \sigma_{y2}} e^{-\frac{[(y_k - y_{k-1}) - (y_{k-1} - y_{k-2}) - \mu_{y2}]^2}{2\sigma_{y2}^2}}$$

The parameters of the model ($\mu_{x1}, \sigma_{x1}, \mu_{y1}, \sigma_{y1}, \mu_{x2}, \sigma_{x2}, \mu_{y2}, \sigma_{y2}$) may be derived from training data. The training data may be, for example, 500,000 strokes captured by a Wacom tablet, in which the camera is associated with an active pen so that an image captured by the camera may be associated with an image captured by a digitizer on the Wacom tablet.

Some initial values may be used for the variables. For example, the parameters of the model ($\mu_{x1}, \sigma_{x1}, \mu_{y1}, \sigma_{y1}, \mu_{x2}, \sigma_{x2}, \mu_{y2}, \sigma_{y2}$) may be independent of the size of the paper, and the initial values of the model may be (0, 1.3905, 0, 1.729, 0, 0.58573, 0, 0.71547).

Having a relatively high sampling rate (above 62 frames per second) for the camera 203 provides a greater alignment of the new locations to a Gaussian distribution. However, this also provides a greater number of images to process.

The above model (of equations 27 and 28) provide paths by handling candidates provided by the active and passive coding systems above and compared with a Viterbi search algorithm. However, in reality, the basic Viterbi search algorithm will fail if there are no correct candidates. To accommodate this difficulty, a Viterbi search system with a skipping feature may be used address this issue.

For a new frame i, the candidates are represented by $C_i$. Without the skipping feature, the new frame i is linked to the previous frame's candidates, the (i−1)th frame's candidates $C_{i-1}$, to get the probability $p_i$. However, with the skip feature, the new frame i is linked, not only to the previous frame (i−1), but also to the previous frames (i−2, i−3 . . . i−n), where n is the skipping range.

Figure 7:
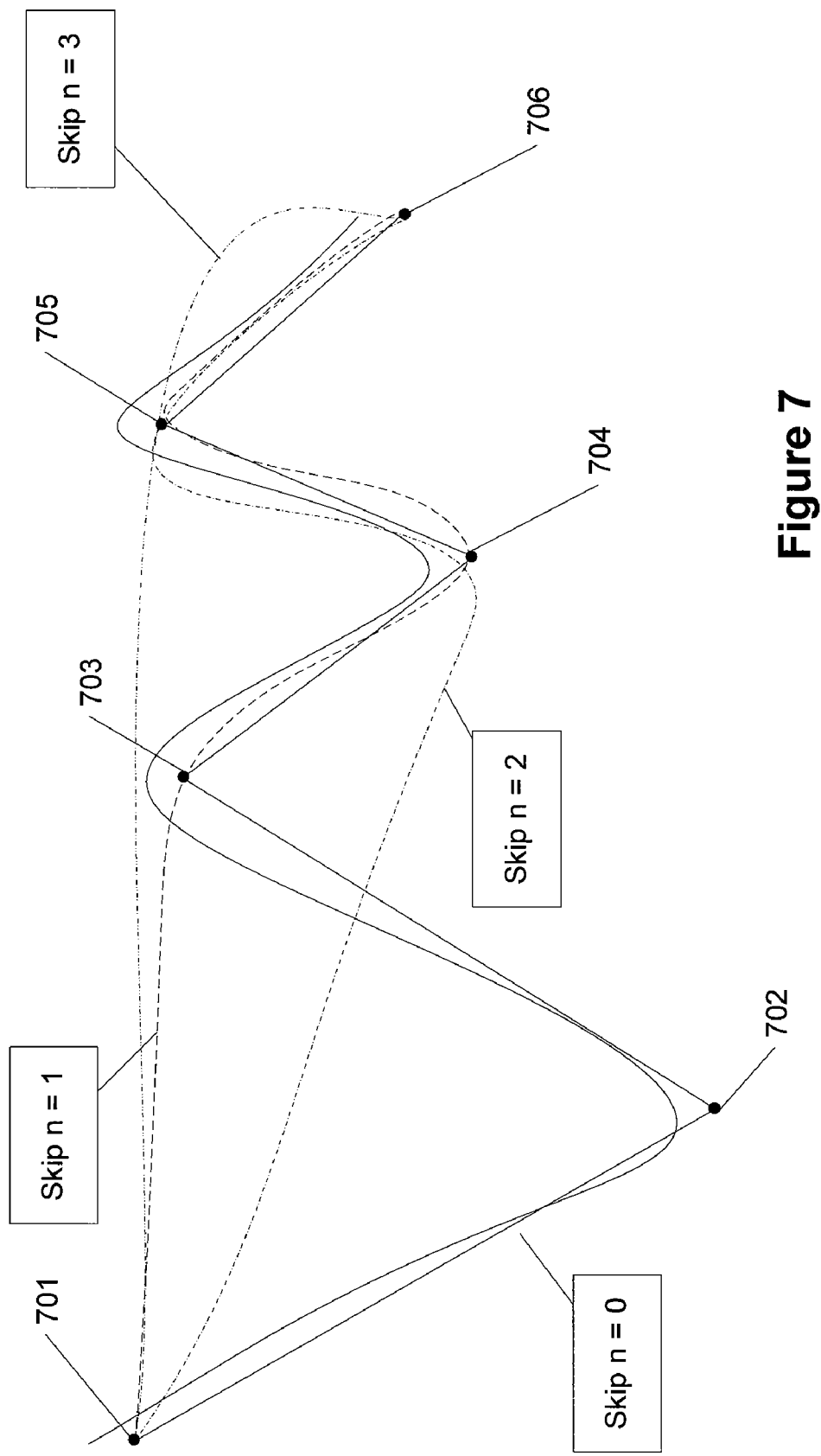

FIG. 7 shows the skipping feature in action. Pen path from 706 to 701 (represented as 706-705-704-703-702-701) includes a pen passing through each of the points. Because there is a higher probability that the pen did not move too much between captured image frames, point 702 may be errant. To eliminate point 702 from the analysis, the skipping feature may be used. FIG. 7 shows line segments (dotted) as the number of points to skip increases. This results in line segments 706-705-704-703-701 (for n=1), 706-705-704-701 (for n=2), and 706-705-701 (for n=3).

The bigram model may be represented as $Pr(L)=Pr(l_{k-1})\times Pr(l_k | l_{k-1})$. With the skip feature, the bigram model may be represented as $$Pr(L) = \max_n (Pr(l_{k-n}) \times Pr(l_k | l_{k-n})).$$

The trigram model (based handwriting model) may be represented as Eq. (29) with the skipping feature.

$$Pr(l_k | l_{k-n}) = n_1 \cdot \frac{1}{\sqrt{2\pi} \cdot \sigma_{x2}} e^{-\frac{[(x_k - x_{k-n_1})/n_1 - (x_{k-n_1} - x_{k-n_1-n_2})/n_2 - \mu_{x2}]^2}{2\sigma_{x2}^2}} \cdot \quad (29)$$

$$\frac{1}{\sqrt{2\pi} \cdot \sigma_{y2}} e^{-\frac{[(y_k - y_{k-n_1})/n_1 - (y_{k-n_1} - y_{k-n_1-n_2})/n_2 - \mu_{y2}]^2}{2\sigma_{y2}^2}}$$

Based on the above skipping feature adaptation, several paths may be linked. Among these paths, the path that has the maximum probability may be selected as the path of the pen.

Figure 10:
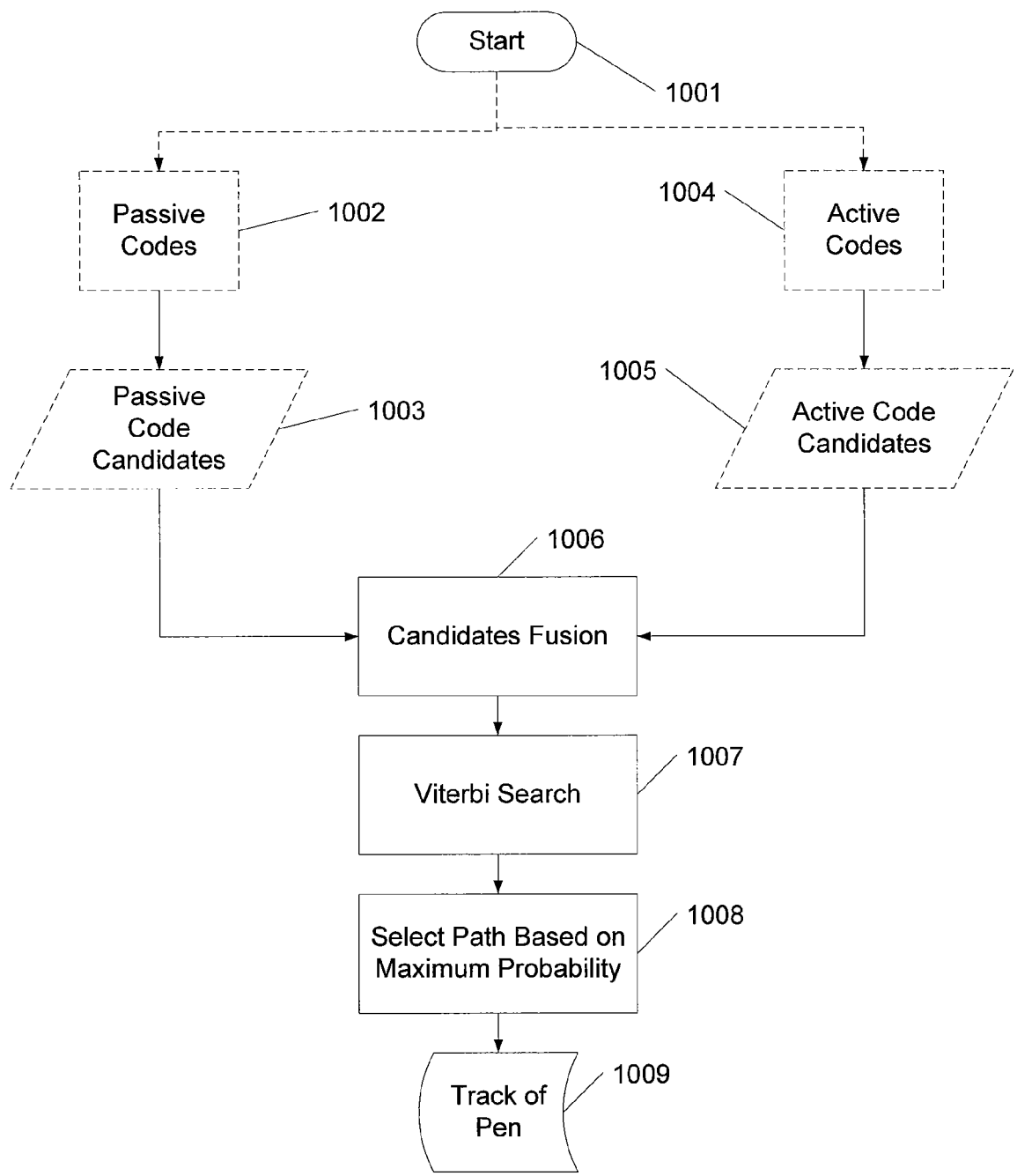
FIG. 10 shows a process for determining the path of a pen in accordance with embodiments of the present invention.

FIG. 10 shows a process for determining the path of a pen. In step 1001, the process starts. Shown in dotted boxes are optional steps of using passive codes in step 1002 and obtaining passive code candidates in step 1003 and using active codes in step 1004 and obtaining active code candidates in step 1005. In step 1006, one or more sets of candidates are grouped together. A Viterbi search is performed in step 1007 on the various candidates from step 1006. A pen path is selected in step 1008 based on the maximum probability of the pen's path proceeding through a selected group of points.

Finally, in step 1009, the path of the pen is outputted. This output may include displaying the result on computer screen or may result of storing an electronic ink annotation with a document.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

We claim:

1. A process for determining a path of a pen having a camera capturing information, which is used to determine candidates for said pen's location with respect to a surface, comprising the steps of:
    segmenting a surface into blocks;
    analyzing the segmented surface to determine a relationship between the blocks of the segmented surface;
    receiving a list of candidates, representative of locations of the pen with respect to the surface, for each image captured by said camera, the list of candidates being constrained by the determined relationship between the blocks of the segmented surface; and
    determining a most likely path of said pen with respect to the surface based on a minimal movement from a previous image captured by said camera and at least one candidate of at least one received list of candidates,
    wherein said process skips at least one candidate of a list of candidates for an image in determining said most likely path.

2. The process according to claim 1, wherein said determining step uses a bigram model.

3. The process according to claim 1, wherein said determining step uses a trigram model.

4. The process according to claim 1, wherein said list of candidates is related to active codes.

5. The process according to claim 1, wherein said list of candidates is related to passive codes.

6. A computer-readable medium having computer-implementable instructions stored thereon, said instructions when executed on a computer, cause the computer to perform the functions of:
    determining a path of a pen having a camera capturing information, which is used to determine candidates for said pen's location with respect to a surface, said instructions comprising the steps of:
    segmenting a surface into blocks;
    analyzing the segmented surface to determine a relationship between the blocks of the segmented surface;
    receiving a list of candidates, representative of locations of the pen with respect to the surface, for each image captured by said camera, the list of candidates being constrained by the determined relationship between the blocks of the segmented surface; and
    determining a most likely path of said pen with respect to the surface based on a minimal movement from a previous image captured by said camera and at least one candidate of at least one received list of candidates,
    wherein said instructions further cause the computer to skip at least one candidate of a list of candidates for an image in determining said most likely path.

7. The computer-readable medium according to claim 6, wherein said determining step uses a bigram model.

8. The computer-readable medium according to claim 6, wherein said determining step uses a trigram model.

9. The computer-readable medium according to claim 6, wherein said list of candidates is related to active codes.

10. The computer-readable medium according to claim 6, wherein said list of candidates is related to passive codes.

11. A system for determining a path of a pen with respect to a surface comprising:
    an input configured to receive information related to an image from a camera attached to said pen; and
    a processor configured to:
    segment a surface into blocks,
    analyze the segmented surface to determine a relationship between the blocks of the segmented surface,
    process said information to obtain a list of candidates, representative of locations of the pen with respect to the surface, for each image captured by said camera, the list of candidates being constrained by the determined relationship between the blocks of the segmented surface, and
    determine a most likely path said pen with respect to the surface based on a minimal movement from a pervious image captured by said camera and at least one candidate of at least one processed list of candidates,
    wherein said processor skips at least one candidate of the list of candidates for the image in determining said most likely path.

12. The system according to claim 11, wherein said processor bases a location of the pen at least in part on a location of at least one potential candidate from at least one previous image from said camera.

13. A system for determining a path of a pen with respect to an encoded medium comprising:
    an encoded medium, said encoded medium including an encoded image;
    a camera configured to capture said encoded image; and
    a processor configured to:
    segment the encoded medium into blocks,
    analyze the segmented encoded medium to determine a relationship between the blocks of the segmented encoded medium,
    process said encoded image to obtain a list of candidates, representative of locations of the pen with respect to the encoded medium, for each encoded image captured by said camera, the list of candidates being constrained by the determined relationship between the blocks of the segmented encoded medium, and
    determine at least one possible location of said encoded image and provide a most likely path of the pen associated with said camera based on a minimal movement from a pervious portion of the encoded image captured by said camera and a number of potential candidates from said encoded medium,
    wherein said processor skips at least one potential candidate of the number of potential candidates for the captured encoded image in providing said most likely path.

14. The system according to claim 13, wherein said encoded medium is a blank paper.

15. The system according to claim 13, wherein said encoded medium is paper with graphical content.

16. The system according to claim 13, wherein said encoded medium is a computer display showing an image combined with an encoded image.

17. The system according to claim 13, wherein said encoded medium is a computer display showing an image, wherein said computer display includes an encoded image associated with the computer display.

18. The system according to claim 17, wherein the encoded image is part of said computer display.

19. The system according to claim 17, wherein the encoded image is a transparent overlay placed over said computer display.

* * * * *